United States Patent
Wolfe

(10) Patent No.: US 6,508,514 B2
(45) Date of Patent: Jan. 21, 2003

(54) PARALLELOGRAM LOAD SENSING APPARATUS FOR A VEHICLE SEAT

(75) Inventor: George B. Wolfe, Plymouth, MI (US)

(73) Assignee: TRW Inc., Lyndhurst, OH (US)

( * ) Notice: Subject to any disclaimer, the term of this patent is extended or adjusted under 35 U.S.C. 154(b) by 40 days.

(21) Appl. No.: 09/779,003

(22) Filed: Feb. 7, 2001

(65) Prior Publication Data

US 2002/0105221 A1 Aug. 8, 2002

(51) Int. Cl.$^7$ ............................................. A47B 97/00
(52) U.S. Cl. ................................................... 297/463.1
(58) Field of Search .......................... 297/344.1, 463.2, 297/216.1, 452.18, 463.1; 248/426; 180/271; 280/727

(56) References Cited

U.S. PATENT DOCUMENTS

| | | |
|---|---|---|
| 2,708,005 A | 5/1955 | Gazzo |
| 3,022,976 A | 2/1962 | Zia |
| 3,766,344 A | 10/1973 | Nevett |
| 4,075,443 A | 2/1978 | Fatur |
| 4,361,741 A | 11/1982 | Leskoverc et al. |
| 5,232,243 A | 8/1993 | Blackburn et al. |
| 5,481,078 A | 1/1996 | Asche |
| 5,502,284 A | 3/1996 | Meiller et al. |
| 5,542,493 A | 8/1996 | Jacobson et al. |
| 5,624,132 A | 4/1997 | Blackburn et al. |
| 5,720,523 A | 2/1998 | Kawabata et al. |
| 5,739,757 A | 4/1998 | Gioutsos |
| 5,810,392 A | 9/1998 | Gagnon |
| 5,864,295 A | 1/1999 | Jarocha |
| 5,877,677 A | 3/1999 | Fleming et al. |
| 6,039,344 A | 3/2000 | Mehney et al. |
| 6,069,325 A | 5/2000 | Aoki |

OTHER PUBLICATIONS

Co–pending U.S. patent application Ser. No. 09/510,653, filed Feb. 22, 2000 entitled, "Weight Sensing Apparatus".
Co–pending U.S. patent application Ser. No. 09/615,860, filed Jul. 13, 2000 entitled, "Seat Load Sensing Apparatus".

Primary Examiner—Milton Nelson, Jr.
(74) Attorney, Agent, or Firm—Tarolli, Sundheim, Covell, Tummino & Szabo L.L.P.

(57) ABSTRACT

A vehicle has a seat (2) for a vehicle occupant and a vehicle floor pan (4). An apparatus (10) includes a vehicle seat frame (20) for supporting a load of the vehicle occupant and a weight sensing mechanism (40) for sensing the load. The weight sensing mechanism (40) includes a parallelogram linkage (50), a sensor lever (70), and a sensor (79). The parallelogram linkage (50) includes a first beam (52) and a second beam (62) parallel to the first beam (52). The beams (52, 62) have adjacent interconnected first ends (54, 64) that receive the load of the vehicle occupant and adjacent interconnected second ends (56, 66) that transmit the load of the vehicle occupant to the vehicle floor pan (4). The beams (52, 62) bend in response to the load of the vehicle occupant. The sensor lever (70) is interposed between the beams (52, 62) and deflects upon bending of the beams (52, 62). The sensor (79) senses the deflection of the sensor lever (70) and provides an output signal indicative of the amount bending of the beams (52, 62).

12 Claims, 4 Drawing Sheets

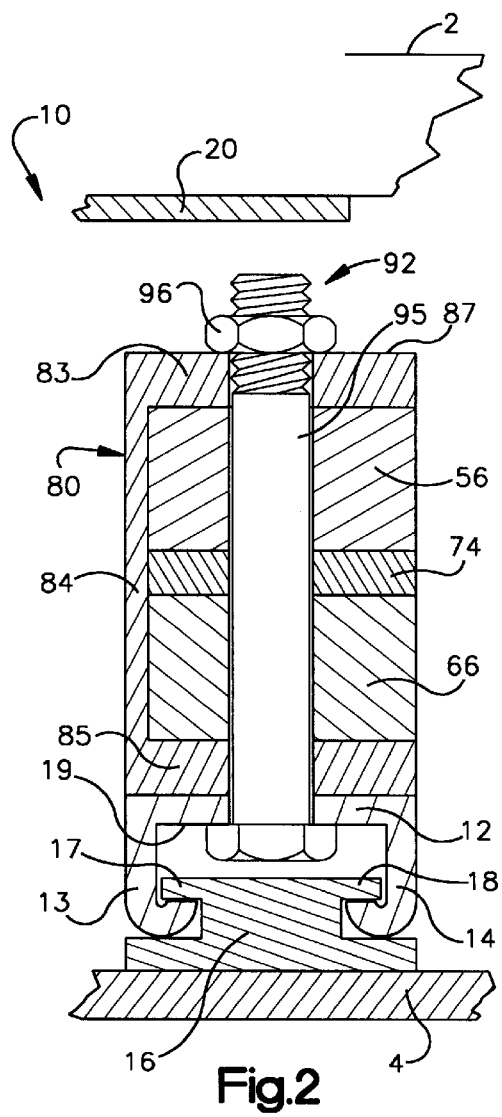
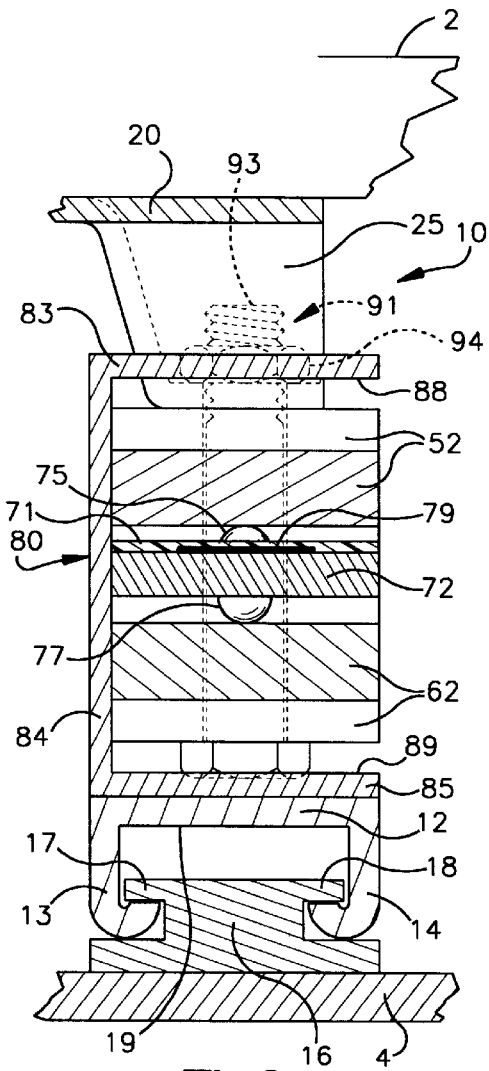

PARALLELOGRAM LOAD SENSING APPARATUS FOR A VEHICLE SEAT

TECHNICAL FIELD

The present invention relates to an apparatus for sensing a load, and more particularly, to an apparatus for sensing a load imparted to a vehicle seat by a vehicle occupant.

BACKGROUND OF THE INVENTION

A conventional vehicle occupant load sensing apparatus includes a load sensor placed between a vehicle seat frame and a support mount for the seat. The sensor is directly within the vertical load path of the occupant's weight and responds to the vertical loads imparted to the seat by the occupant of the seat. Since the seat frame and the support mount must withstand large torque loads (i.e., tilting of the seat frame during crash conditions), typically the sensor also must be constructed to withstand large torque loads. This construction lessens the sensitivity of the sensor in the vertical load path. Thus, the sensor may not produce a reliable vertical load output signal.

A load sensing apparatus, which decouples the torque and vertical loads and also maintains a constant vertical spring rate, would not have to withstand substantial torque loads and thereby may be more likely to produce an accurate occupant load output signal which is consistent for equal upward and downward loads in the vertical load path.

SUMMARY OF THE INVENTION

The present invention relates to an apparatus for use in a vehicle having a seat for a vehicle occupant and a vehicle floor pan for supporting the vehicle seat. The apparatus includes a vehicle seat frame for supporting a load of the vehicle occupant in the vehicle seat and a weight sensing mechanism for sensing the load of the vehicle occupant. The weight sensing mechanism includes a parallelogram linkage, a sensor lever, and a sensor. The parallelogram linkage includes a first beam and a second beam that extends parallel to the first beam. The first and second beams each have adjacent interconnected first ends that receive the load of the vehicle occupant. The first and second beams each further have adjacent interconnected second ends. The second ends transmit the load of the vehicle occupant to the vehicle floor pan. The first and second beams each bend in response to the load of the vehicle occupant. The sensor lever is interposed between the first and second beams. The sensor lever has a connection with the first and second beams that causes the sensor lever to deflect upon bending of the first and second beams. The sensor senses the deflection of the sensor lever and provides an output signal indicative of the amount bending of the first and second beams.

BRIEF DESCRIPTION OF THE DRAWINGS

The foregoing and other features of the invention will become more apparent to one skilled in the art upon consideration of the following description of the invention and the accompanying drawings, in which:

FIG. 2 is a schematic view of the apparatus of FIG. 1 taken along line 2—2 of FIG. 1;

FIG. 3 is a schematic view of the apparatus of FIG. 1 taken along line 3—3 of FIG. 1;

DESCRIPTION OF THE PREFERRED EMBODIMENTS

Figure 1:
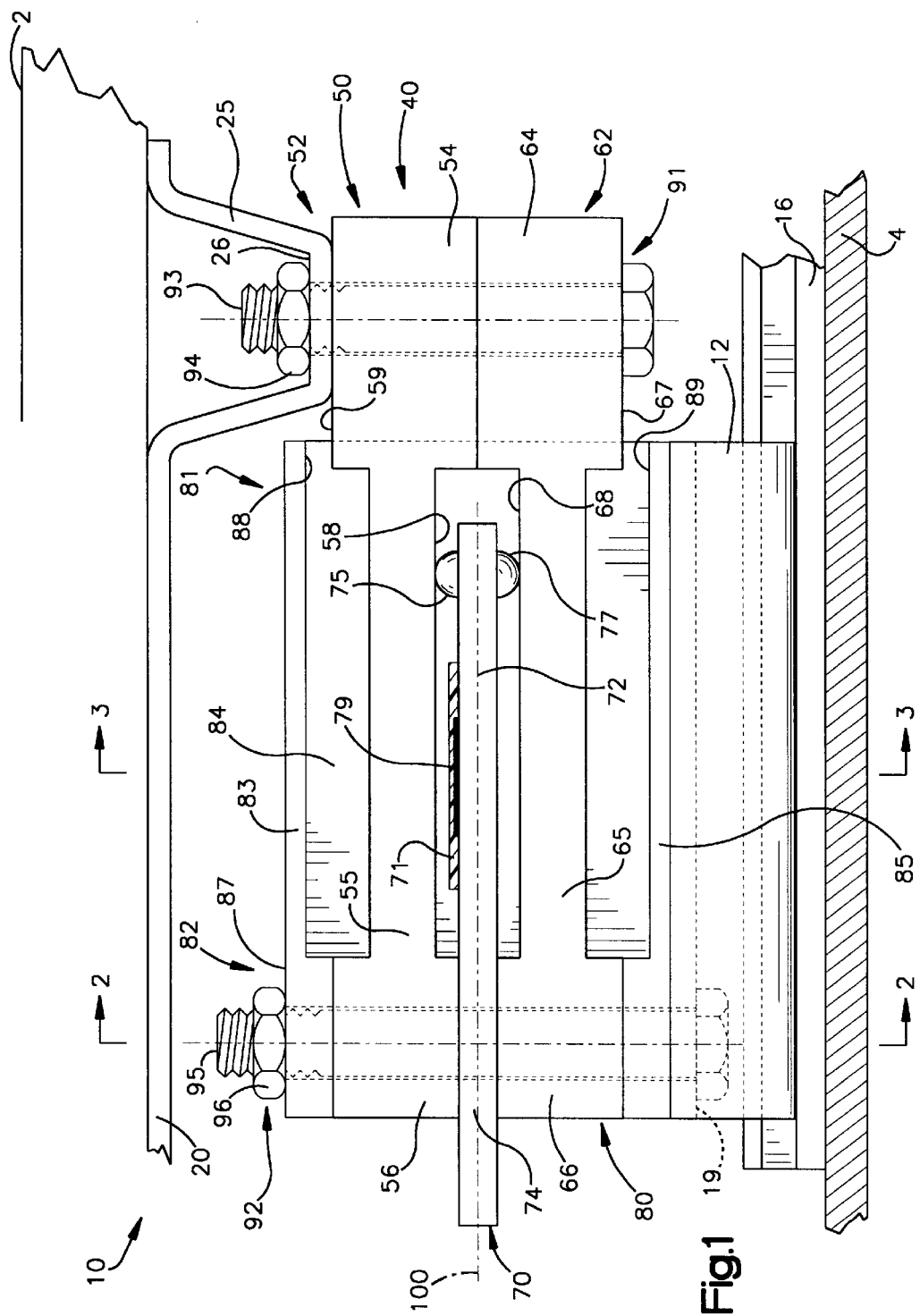
FIG. 1 is a schematic view of an apparatus embodying the present invention.

According to the present invention, as shown in FIGS. 1–5, a parallelogram load sensing apparatus 10 is used in a vehicle having a seat 2 for a vehicle occupant. A vehicle floor pan 4 supports the vehicle seat 2. The apparatus 10 includes a vehicle seat frame 20 for supporting the vehicle seat 2, an upper track 12 for supporting the vehicle seat frame, a lower track 16 for adjustably supporting the upper track, a weight sensing mechanism 40, a first fastener assembly 91, and a second fastener assembly 92.

The vehicle seat frame 20 supports a weight load of the vehicle occupant in the vehicle seat 2. The load of the vehicle occupant in the vehicle seat 2 is transmitted from the vehicle seat frame 20 through the weight sensing mechanism 40, the upper track 12, and the lower track 16 to the vehicle floor pan 4. During a vehicle collision, the seat frame 20 may also sustain upward and lateral loads.

The lower track 16 is fixedly attached to the vehicle floor pan 4. The lower track 16 has two opposite side rails 17, 18 (FIG. 2). The upper track 12 has two opposite rails 13, 14 that slidingly engage the respective side rails 17, 18 of the lower track 16. The upper track 12 may slide on the lower track 16 for forward or rearward adjustment of the position of the seat 2 for occupants of different sizes, as is known in the art.

The weight sensing mechanism 40 is supported by the upper track 12. The weight sensing mechanism 40 senses the load of the vehicle occupant. The weight sensing mechanism 40 includes a parallelogram linkage 50, a sensor lever 70, and a sensor 79.

The parallelogram linkage 50 defines a parallelogram in a vertical plane perpendicular to the vehicle floor pan 4 and parallel to the forward/rearward movement of the vehicle. The parallelogram linkage 50 includes a first beam 52 and a second beam 62 extending parallel to the first beam. The first and second beams 52, 62 have adjacent, fixedly interconnected first ends 54, 64 that receive the load of the vehicle occupant from the seat frame 20. The first and second beams 52, 62 further have adjacent, fixedly interconnected second ends 56, 66 opposite the respective first ends 54, 64. Intermediate portions 55, 65 of the respective first and second beams 52, 62 interconnect the first ends 54, 64 and second ends 56, 66 of the first and second beams 52, 62, respectively. The second ends 56, 66 transmit the load of the vehicle occupant to the vehicle floor pan 4.

The first and second beams 52, 62 are identical in construction and bend in response to a load applied to the beams in an upward or downward direction. The sensor lever 70 is interposed between the intermediate portions 55, 65 and the second ends 56, 66 of the first and second beams 52, 62.

The intermediate portions 55, 65 of the first and second beams 52, 62 have smaller vertical dimensions than the ends 54, 56, 64, 66 of each beam 52, 62 (as viewed in FIG. 1). The intermediate portions 55, 65 are vertically thinner than the ends 54, 56, 64, 66. The vertically larger ends 54, 56, 64, 66 and the intermediate portions of the beams 52, 62 create a closed parallelogram configuration (as viewed in FIG. 1).

The sensor lever 70 has a longitudinal axis 100. The sensor lever 70 and its longitudinal axis extend horizontally in an unloaded, or unstressed, condition of the sensor lever 70 (as viewed in FIG. 1). The first and second beams 52, 62 are disposed above and below, respectively, the axis 100 of the sensor lever 70 with the intermediate portions 55, 65 of the beams located at equal distances from the axis (as viewed in FIG. 1). The sensor lever 70 further has a first end portion 72 and a second end portion 74 opposite the first end portion. The second end portion 74 of the sensor lever 70 is interposed between, and has a fixed connection with, the second ends 56, 66 of the first and second beams 52, 62. The second end portion 74 of the sensor lever 70 has an opening (not shown) for fixing the sensor lever 70 in an interposed position between the second ends 56, 66 of the first and second beams 52, 62.

The first end portion 72 of the sensor lever 70 is operatively associated with the intermediate portions 55, 65 of the first and second beams 52, 62. The sensor lever 70 bends upon vertical movement of the first ends 54, 64 of the first and second beams 52, 62 (as viewed in FIGS. 4 and 5).

The sensor lever 70 typically has a vertical thickness substantially less than that of each intermediate portion 55, 65 such that the stiffness of the sensor lever is about one-tenth that of the combined stiffness of each intermediate portion. For example, if a ten-pound vertical load would deflect the sensor lever 70 a predetermined amount, a one hundred pound vertical load would be required to deflect the two intermediate portions 55, 65 that same predetermined amount.

The sensor lever 70 and the first and second beams 52, 62 are typically constructed of a suitable spring-like material such as steel or an engineered laminate. Aluminum may also be used entirely or in combination with steel or other suitable metal.

The sensor 79 senses the bending of the sensor lever 70 and provides an electrical output signal indicative of the amount of bending of the sensor lever. The amount of bending of the sensor lever 70 is relate d to the amount of bending of the first and second beams 52, 62. The sensor 79 provides an output signal dependent upon the amount of bending of the sensor lever 70. The sensor 79 is preferably a strain gauge sensor that is applied to the first end portion 72 of the sensor lever 70, preferably by a silk-screening process.

The first end portion 72 of the sensor lever 70 may be over-molded with a polymer for environmentally sealing the sensor 79 mounted thereon. The first end portion 72 of the sensor lever 70 may then have a greater vertical thickness than the unsealed second end portion 74 of the sensor lever 70.

The first end portion 72 of the sensor lever 70 further includes an upper curved surface 75 and a lower curved surface 77. The upper curved surface 75 engages a lower surface 58 of the intermediate portion 55 of the first beam 52. The lower curved surface 77 engages an upper surface 68 of the intermediate portion 65 of the second beam 62. These curved surfaces 75, 77 may be portions of a sphere or some other suitably curved shape. The curved surfaces 75, 77 may also be curved end portions of fasteners, such as rivets, mounted on the sensor lever 70 (as viewed in the FIGS.) or one each on the upper and lower surfaces 58, 68 of the intermediate portions 55, 65 of the first and second beams 52, 62.

The sensor lever 70 essentially bends only in a vertical plane about a horizontal axis (as viewed in FIG. 1). The lower and upper surfaces 58, 68 of the beams 52, 62 define spherical actuation points that will "roll" with the upper and lower curved surfaces 75, 77, respectively, if a torsional load which tends to twist the parallelogram linkage 50 about the axis 100, for example, is placed on the parallelogram linkage 50. A lateral load on the parallelogram linkage 50 is transferred through both beams 52, 62 from the vehicle seat frame 20 to the vehicle floor pan 4. The sensor lever 70 and the sensor 79 thereby incur minimal torsional or lateral loading due to the spherical actuation points that allow minimal torsional deflection of the sensor lever 70 as the parallelogram linkage 50 is twisted about the axis 100.

The weight sensing mechanism 40 further includes a C-shaped housing 80 (as viewed in FIGS. 2 and 3). The housing 80 is typically constructed of a suitable metal such as steel. The housing 80 has a first end portion 81 for limiting the vertical displacement of the first ends 54, 64 of the first and second beams 52, 62 and a second end portion 82 for fixed connection to the upper track 12 by the first fastener assembly 91. The housing 80 further includes an upper horizontal portion 83, a lower horizontal portion 85, and a vertical intermediate portion 84 interconnecting the upper and lower portions.

The first fastener assembly 91 includes a first fastener 93 and a first fastener member 94. The first fastener 93 may be a bolt with a head that engages a lower surface 67 of the first end 64 of the second beam 62. As viewed in FIGS. 1, 3, and 4, the shaft of the first fastener 93 extends upward from the head through an opening in the first end 64 of the second beam 62, an opening in the first end 54 of the first beam 52, and an opening in an offset spacer portion 25 of the seat frame 20. The spacer portion 25 is offset so that the vehicle seat frame 20 will not spatially interfere with the weight sensing mechanism 40 as the vehicle seat frame moves downward (or upward) under loading conditions.

The first fastener member 94 may be a nut that is threaded onto the first fastener 93 and engages an upper surface 26 of the offset spacer portion 25 of the vehicle seat frame 20. The first fastener 93 and first fastener member 94 thereby fixedly secure the vehicle seat frame 20, the first end 54 of the first beam 52, and the first end 64 of the second beam 62 together as the first fastener member 94 is tightened sufficiently against the upper surface 26 of the offset spacer portion 25 of the vehicle seat frame.

The second fastener assembly 92 includes a second fastener 95 and a second fastener member 96. The second fastener 95 may be a bolt with a head that engages a lower surface 19 of the upper track 12. As viewed in FIGS. 1, 2, and 4, the shaft of the second fastener 95 extends upward from the head through an opening in the upper track 12, an opening in the lower horizontal portion 85 of the housing 80, an opening in the second end 66 of the second beam 62, an opening in the second end portion 74 of the sensor lever 70, an opening in the second end 56 of the first beam 52, and an opening in the upper horizontal portion 83 of the housing 80.

The second fastener member 96 may be a nut that is threaded onto the second fastener 95 and engages an upper surface 87 of the second portion 82 of the housing 80. The second fastener 95 and second fastener member 96 thereby fixedly secure the housing 80, the second end 56 of the first beam 52, the second end portion 74 of the sensor lever 70, the second end 66 of the second beam 62, and the upper track 12 together as the second fastener member 96 is tightened sufficiently against the lower surface 19 of the upper track 12.

The fasteners 93, 95 and the fastener members 94, 96 of each fastener assembly 91, 92 may be constructed of a suitable metal such as stainless steel. Other corrosion-resistant materials of sufficient strength may also be used.

Further, the apparatus 10 may be additionally secured against lateral and rotational movement relative to the vehicle floor pan 4. The lower horizontal portion 85 of the housing 80 may be welded to the upper track 12 or a third fastener assembly (not shown) may be used to bolt the lower horizontal portion 85 of the housing 80 to the upper track 12 at a location spaced from the location of the second fastener assembly 92. Since the upper track 12 and the lower track 16 cannot move laterally and rotationally relative to the vehicle floor pan 4, the secured apparatus 10 cannot move laterally and rotationally relative to the vehicle floor pan 4.

Figure 4:
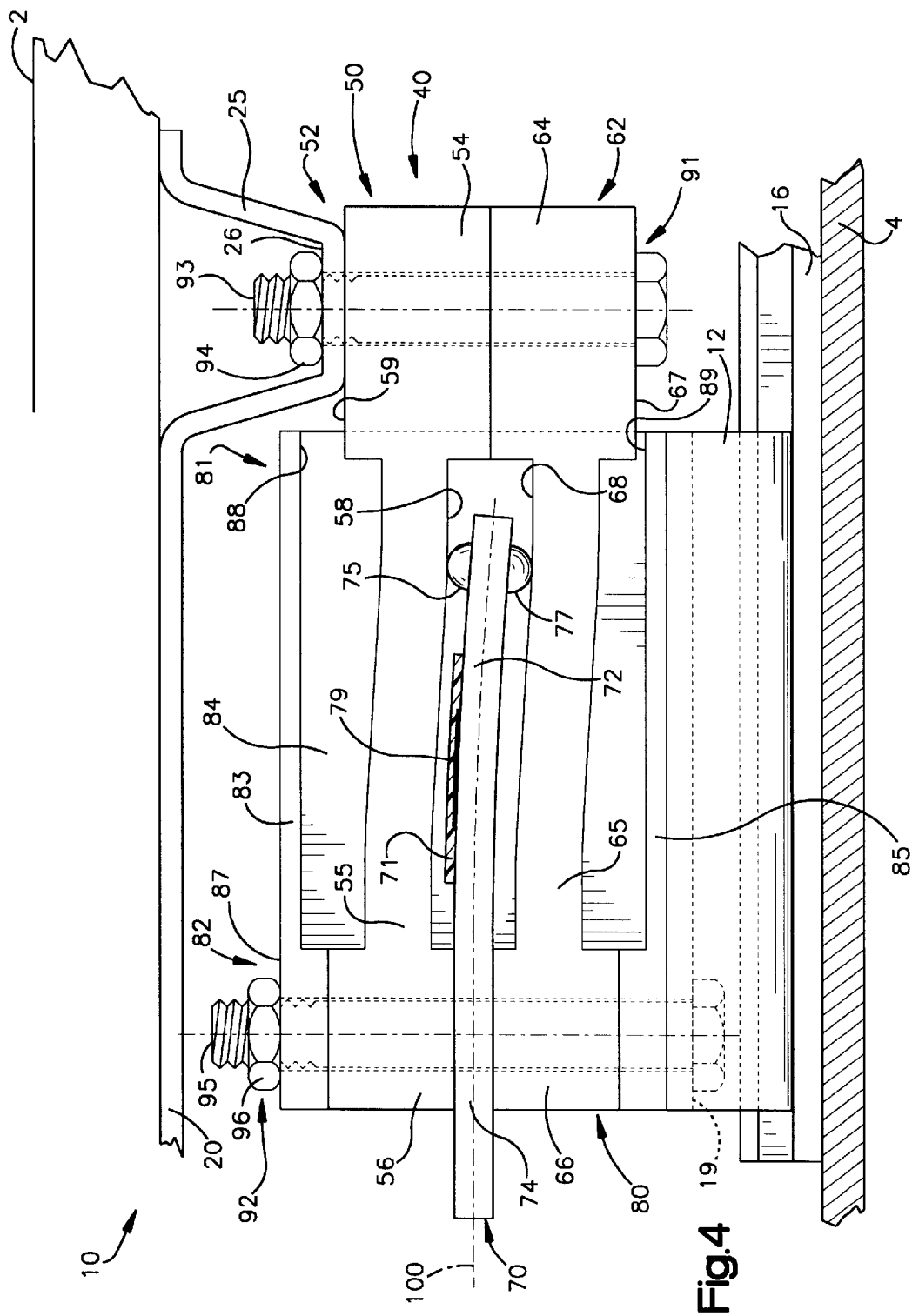
FIG. 4 is a schematic view of the apparatus of FIG. 1 under a loaded condition.

When a downward load is placed on the vehicle seat frame 20, the downward load is transmitted through the offset spacer portion 25 of the vehicle seat frame to the first end 54 of the first beam 52 and the first end 64 of the second beam 62. Since the second ends 56, 66 of the first and second beams 52, 62 are fixed to the vehicle floor pan 4 through the upper track 12, the first ends 54, 64 of the first and second beams 52, 62 will move downward with the vehicle seat frame 20. As the first ends 54, 64 move downward, the intermediate portions 55, 65 resiliently deflect downward as shown in FIG. 4.

The first and second beams 52, 62 act as spring elements and transfer the load from the vehicle seat frame 20 to the vehicle floor pan 4. The thinner vertical dimensions of the intermediate portions 55, 65 of the first and second beams 52, 62 facilitate downward deflection of the beams while the second ends 56, 66 remain vertically fixed relative to the vehicle floor pan 4.

The vehicle seat frame 20 is fixed to the vehicle floor pan 4 at least at two locations and preferably four locations, i.e., at each corner of the seat. Thus the vehicle seat frame 20 is constrained to move only vertically (linearly downward). The vehicle seat frame 20 does not move horizontally or rotationally. The deflected intermediate portions 55, 65 of the beams 52, 62 assume an "S" shape (as viewed in FIG. 4).

Figure 5:
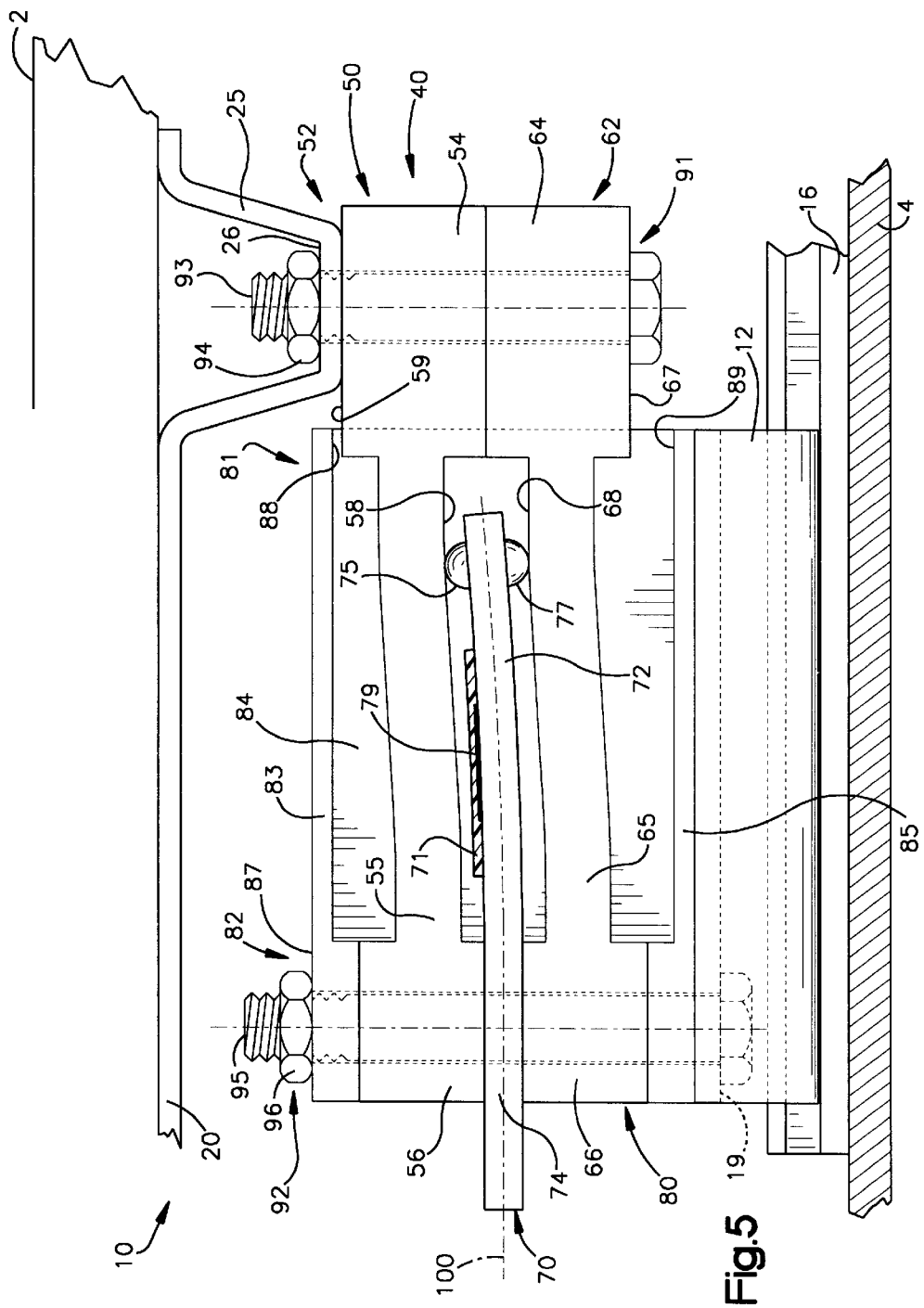
FIG. 5 is a schematic view of the apparatus under a different loaded condition.

When an upward load is placed on the vehicle seat frame 20, the upward load is transmitted through the offset spacer portion 25 of the vehicle seat frame to the first end 54 of the first beam 52 and the first end 64 of the second beam 62. Since the second ends 56, 66 of the first and second beams 52, 62 are fixed to the vehicle floor pan 4 through the upper track 12, the first ends 54, 64 of the first and second beams 52, 62 will move upward with the vehicle seat frame 20 and the intermediate portions 55, 65 of the beams will resiliently deflect upward as shown in FIG. 5. The thinner vertical dimensions of the intermediate portions 55, 65 of the first and second beams 52, 62 facilitate upward deflection while the second ends 56, 66 remain vertically fixed relative to the vehicle floor pan 4. Since the vehicle seat frame 20 is constrained to move essentially only vertically (linearly upward), the deflected intermediate portions 55, 65 assume a sideways "S" shape (as viewed in FIG. 5).

The parallelogram linkage 50 may receive cross-car forces that act transverse to the axis 100 of the sensor lever 70. Such forces may impart torsional forces about the axis 100 to the first and second beams 52, 62. However, any rotation that is incurred by the parallelogram linkage 50 about the axis 100 will not significantly affect the spring rate, or stiffness, of the beams 52, 62 to vertical loading at the first ends 54, 64 of the first and second beams 52, 62. The dual, identical beam configuration, with each beam 52, 62 being of identical construction and identically associated with the axis 100, balances any rotation about the axis 100 created by torsional loading such that the effective moment of inertia and vertical spring rate of the beams about the axis 100 remains unchanged. For example, if torsional loading of the beams 52, 62 occurred, tension or compression induced in beam 52 would be offset by equal and opposite tension and compression induced in beam 62. If torsional loading of the beams 52, 62 has occurred, the change in moment of inertia about the axis 100 caused by the torsional deflection of the beam 52 would be offset by an equal and opposite change in moment of inertia about the axis 100 caused by the torsional deflection of the beam 62.

Also, the first and second beams 52, 62, acting together in tandem, balance any cross-sectional deformations (as viewed in FIG. 3) of the beams that would alter the vertical spring rate as compared to using only one beam. Thus, the vertical spring rate remains constant even after some deflection (and some cross-sectional deformation) has occurred.

The relationship of the vertical load placed on the first ends 54, 64 of the beams 52, 62 by the vehicle seat frame 20 to the vertical displacement of the first ends of the beams is linear and the same in both the upward and downward directions of movement of the seat frame 20. Thus, the output of the sensor 79 on the sensor lever 70 is also linear, and the same in both the upward and downward directions of movement of the seat frame 20.

The first end portion 81 of the housing 80 provides travel stops for the parallelogram linkage 50. A lower surface 88 of the upper horizontal portion 83 of the housing 80 prevents the first ends 54, 64 of the first and second beams 52, 62 from moving upward more than a predetermined amount as an upper surface 59 of the first end 54 of the first beam 52 engages the lower surface 88. An upper surface 89 of the lower horizontal portion 85 of the housing 80 prevents the first ends 54, 64 of the first and second beams 52, 62 from moving downward more than a predetermined amount as the lower surface 67 of the first end 64 of the second beam 62 engages the upper surface 89. The typical downward and upward amounts of travel permitted by these stops are 1.0 mm.

Any initial stresses incurred by the sensor 79 due to initial bending of the sensor lever 70 by manufacturing tolerances or assembly (i.e., tightening of the fastener, etc.) may be factored out during an initial calibration of the sensor. The sensor lever 70 essentially bends only in a vertical plane about a horizontal axis (as viewed in FIG. 1). As stated earlier, torsional and lateral stresses are decoupled from the bending stresses by the upper and lower curved surfaces 75, 77 of the first end portion 72 of the sensor lever 70.

The first end portion 72 of the sensor lever 70 pivots (deflects) as the first end portion 72 is forced downward or upward by the intermediate portions 55, 65 of the first and second beams 52, 62. As viewed in FIGS. 4 and 5, the first and second beams 52, 62 are forced into the sideways "S" shape while the sensor lever 70 is bent downward or upward.

The sensor 79 produces an output signal directly proportional to the vertical force applied to the vehicle seat frame 20 via the vehicle seat 2 (i.e., the weight of the vehicle occupant, a load incurred during a vehicle collision, etc.). Overloading of the sensor 79 is prevented by the surfaces 88, 89 of the housing 80, as discussed above. The sensor 79, while preferably a strain gauge sensor, may be any comparable sensor.

The apparatus 10 may be placed at a corner of a rectangular seat frame and may be used in conjunction with other similar apparatuses to generate multiple signals (such as two at the front corners of a seat frame and two at the rear corners of a seat frame). A wire harness may transmit the output signals from the apparatuses to an electrical controller.

The sensor 79 may be electrically connected to the controller by lead wires running to connector plugs (not shown) mounted on the second end portion of the lever. The controller processes the signals from the apparatuses at each corner of the seat and generates an output signal indicative of the load on the seat frame. The multiple signals also can be analyzed by the controller to produce output signals for controlling occupant protection devices, such as air bags, seat belt retractors, seat belt pretensioners, etc.

A seat belt assembly (not shown) may also be associated with the vehicle seat. The seat belt assembly would include a seat belt retractor, mounted for example to the vehicle floor pan, and a seat belt buckle connected to the upper track. The seat belt would extend from the retractor to the buckle across a vehicle occupant in the seat.

From the above description of the invention, those skilled in the art will perceive improvements, changes and modifications. Such improvements, changes and modifications are intended to be included within the scope of the appended claims.

Having described the invention, the following is claimed:

1. An apparatus for use in a vehicle having a seat for a vehicle occupant and a vehicle floor pan for supporting the vehicle seat, said apparatus comprising:
   a vehicle seat frame for supporting a load of the vehicle occupant in the vehicle seat; and
   a weight sensing mechanism for sensing the load of the vehicle occupant, said weight sensing mechanism including:
      a parallelogram linkage including a first beam and a second beam parallel to said first beam, said first and second beams each having adjacent interconnected first ends which receive the load of the vehicle occupant, said first and second beams each further having adjacent interconnected second ends, said second ends for transmitting the load of the vehicle occupant to the vehicle floor pan, said first and second beams each bending in response to the load of the vehicle occupant;
      a sensor lever interposed between said first and second beams, said sensor lever having a connection with said first and second beams, said connection causing said sensor lever to deflect upon bending of said first and second beams; and
      a sensor for sensing the deflection of said sensor lever and providing an output signal indicative of the amount bending of said first and second beams.

2. The apparatus as defined in claim 1 wherein said sensor is located on a portion of said sensor lever, said portion of said sensor lever being over-molded with a polymer for environmentally sealing said sensor.

3. The apparatus as defined in claim 1 further including an upper track fixedly connected to said weight sensing mechanism, said upper track engaging a lower track and movable on said lower track for adjusting said seat for occupants of different sizes.

4. The apparatus as defined in claim 1 further including a fastener assembly for securing said weight sensing mechanism and said seat frame together.

5. The apparatus as defined in claim 1 wherein said sensor lever includes a first curved surface engaging a lower surface of said first beam and a second curved surface engaging an upper surface of said second beam.

6. The apparatus as defined in claim 5 wherein said first and second curved surfaces allow pivoting of one end portion of said sensor lever as said sensor lever is deflected.

7. The apparatus as defined in claim 6 wherein said first ends of said first and second beams move only vertically as said sensor lever is deflected.

8. The apparatus as defined in claim 1 further including a housing having surfaces defining travel stops limiting linear movement of said first ends of said first and second beams as said first and second beams bend.

9. An apparatus for use in a vehicle having a seat for a vehicle occupant and a vehicle floor pan for supporting the vehicle seat, said apparatus comprising:
   a vehicle seat frame for supporting a load of the vehicle occupant in the vehicle seat; and
   a weight sensing mechanism for sensing the load of the vehicle occupant, said weight sensing mechanism including:
      a parallelogram linkage including a first beam and a second beam parallel to said first beam, said first and second beams each having adjacent interconnected first ends which receive the load of the vehicle occupant, said first and second beams each further having adjacent interconnected second ends, said second ends for transmitting the load of the vehicle occupant to the vehicle floor pan, said first and second beams each deflecting in response to the load of the vehicle occupant; and
      a sensor lever interposed between said first and second beams, said sensor lever having a longitudinal axis and a connection with said first and second beams, said connection causing said sensor lever to bend upon deflection of said first and second beams; and
      a sensor for sensing the deflection of said sensor lever.

10. The apparatus as defined in claim 9 wherein said first beam and said second beam are disposed equidistantly from said longitudinal axis of said sensor lever when said first and second beams are in an unloaded condition.

11. The apparatus as defined in claim 10 wherein said sensor lever has a vertical stiffness that is about one-tenth the vertical stiffness of the first and second beams combined.

12. The apparatus as defined in claim 9 wherein said first ends of said first and second beams move only linearly in response to a vertical load of the vehicle occupant.

* * * * *